United States Patent Office 3,093,611
Patented June 11, 1963

3,093,611
DISPERSIONS OF C₂-C₃ POLYOLEFINS IN WATER-SOLUBLE DIALKYL AMIDE OF AN ALKANOIC ACID
John C. Thomas, Hockessin, Del., assignor to E. I. du Pont de Nemours and Company, Wilmington, Del., a corporation of Delaware
No Drawing. Filed Dec. 27, 1960, Ser. No. 78,343
17 Claims. (Cl. 260—29.6)

This invention relates to, and has as its primary objects provision of, new compositions of matter and methods for the preparation of the same.

Olefin polymers are produced in very large amounts and, in the form of films, are finding expanding uses in the wrapping-foil field. These films can be made either by melt-extrusion or by casting from organic solvent solutions and evaporating the solvent. The known solvents are insoluble in water and are principally hydrocarbons.

This invention provides new compositions comprising, as essential components, a polymer of an olefin of two or three carbons and a dialkylamide of an alkanoic acid wherein the N-alkyl groups each contain from one to three carbons and together contain at least four carbons and the alkanoic acid contains one to three carbons. More particularly, it provides solutions (molecular dispersions) of the polymers in these dialkylamides, and dispersions of the polymers in aqueous solutions of the dialkylamides.

The fact that the above-mentioned dialkylamides are soluble in water and are active solvents for olefin polymers at elevated temperatures contributes importantly to the utility of the olefin polymer-dialkylamide blends. Thus, it makes possible preparation of aqueous olefin-polymer dispersions from which porous, pressure-clarifiable films and coatings can readily be made. Because of their miscibility with water, the dialkylamides are readily removed from the films or coatings by washing with water. The properties of the dialkylamides also make possible the preparation of solutions of olefin polymers from which films can be made by casting or by coating, from which films the amide can readily be removed by washing with water.

The new compositions of this invention are conveniently made by intimately mixing an olefin polymer and the selected dialkylamide. For example, a mixture of the olefin polymer and the dialkylamide can be agitated at a temperature high enough to produce a solution of the polymer in the amide. In such a mixture, the olefin polymer content can be from 0.1% to 50% and is preferably from 5% to 25%. Films can be prepared from these solutions by casting on a suitable support, immersing the wet film in water, washing the coagulated film thus produced in water, and drying in air. The films thus produced are opaque, porous, and sometimes leathery, and can be clarified by heat or pressure.

In another method, the dialkylamide can be added with agitation to an aqueous dispersion of the olefin polymer containing from 5–50% of olefin polymer, in amount such that the ratio of amide:olefin polymer is from 1:10 to 10:1, preferably 3:1 to 7:1. The agitation required to produce homogeneous blends of amide and olefin polymer by this method can be obtained by ball-milling, a charge being used in which the ratio by weight of the balls to olefin polymer is from 2:1 to 20:1, and usually from 5:1 to 10:1. The time of ball-milling can be as short as 0.5 hour, or it can be extended to a day or more. Generally, however, three to ten hours are sufficient to produce a homogeneous blend.

Films can be prepared from dispersions made by this second method by casting on a suitable support, removing a substantial amount of water from the film by evaporation at a temperature high enough for the amide to exert solvent action on the polymer, as evidenced by substantial clarification, coagulating the partly coalesced film by immersion in water, washing the film with water to remove the dialkylamide, and drying in air. The resultant films are semi-opaque to opaque and have an open-cell, porous structure characterized by microscopic voids having a maximum dimension of about 0.1 to 0.2 micron and communicating with the surface. The voids can constitute up to about 60% of the total volume. These films have low bulk densities and are highly permeable, especially to water vapor. They can be clarified by application of pressure alone, although in some instances heat along with pressure is advantageous.

In general, any polymer of an olefin of two to three carbons is suitable for the purpose of this invention. These polymers are hydrophobic, i.e., they are not dissolved, softened, or plasticized by water. Because of the greater ease of preparing aqueous dispersions of ethylene polymers, and, therefore, the wider choice of methods for preparing dialkylamide-polymer blends, polymers of ethylene are preferred. Particularly useful ethylene polymers are those in the density range of from about 0.92 to 0.97 and having a relative viscosity of at least 1.01.[1] When the olefin polymer is polyethylene, either a low-density, branched-chain polymer or a high-density, linear polymer can be used. Because of the greater ease of preparing aqueous dispersions of low-density polyethylene, and, therefore, the wider choice of methods for preparing dialkylamide-polymer blends, the low-density polymer is preferred. Different types of propylene polymers may also be used.

Aqueous ethylene polymer dispersions suitable for preparing blends with dialkylamides in accordance with this invention are preferably those obtained by polymerizing ethylene in the presence of suitable dispersing agents, although there can also be used dispersions obtained by dispersing preformed polymers as disclosed in U.S. 2,290,794.

Dialkylamides suitable in the process of this invention are the N,N-dialkylamides, wherein each of the alkyl groups has one, two, or three carbons, and together contain at least four carbons, of alkanoic acids of one, two or three carbons. Specific examples are di-n-propyl-formamide, di-ethylpropionamide, ethyl-n-propylacetamide, diisopropylacetamide, ethylisopropylacetamide, di-ethylacetamide, di-n-propylacetamide, and n-propyliso-propylacetamide.

The present dispersions are readily fluid, especially when the olefin polymer concentration is less than 25% by weight. These dispersions are employed in the preparation of shaped objects, e.g., films and the like.

Plasticizers, softening agents, pigments, dyes, fillers, etc., can be included to an extent of 0.1% to 10% by weight of the olefin polymers. In some applications for the polyolefins, a small amount of the amide used to prepare the polyolefin solutions or dispersions can be left in the final product, i.e., film or other shaped article, for its plasticizing effect.

The examples which follow are submitted to illustrate and not to limit this invention. In these examples all pressures are atmospheric unless otherwise indicated.

*Example I*

A mixture of 1 g. of a commercial molding-grade polyethylene of density 0.92 (ground to 20–40 mesh) and 4 g. of di-n-propylacetamide was heated with stirring. Between 90° C. and 110° C. the polyethylene particles ag-

---

[1] Measured at 0.1% concentration in tetrahydronaphthalene at 125° C.

glomerated to a swollen mass, which dissolved in a few minutes at 190–200° C. to give a viscous solution. On cooling with stirring, the clear, colorless, homogeneous solution became cloudy at about 185° C. On reheating to 200° C., it became clear again.

Substitution of di-n-propylformamide, diethylacetamide, diisopropylacetamide, and diethylpropionamide for the di-n-propylacetamide in the above process gave similar results.

The solution prepared by the method of Example I was used to make an opaque, porous, self-supporting, coalescible film as follows: The solution was poured on a Pyrex glass plate that had been preheated to 150° C. A film was immediately cast from this liquid with a doctor knife having a clearance of 20 mils. The glass supporting the wet film was immediately immersed in water to coagulate the film. The amide was washed from the coagulated film by leaving the film immersed in water for 16 hours, after which the washed film was dried in air. The product was an opaque, porous film that had an average thickness of 8 mils and could be clarified by pressure.

Another film was prepared by the method just described, except that the glass plate was left on the hot plate for 2 minutes before being immersed in water. An essentially clear film having an average thickness of 1.9 mils was obtained.

*Example II*

A mixture of commercial molding-grade polyethylene of density 0.92 and di-n-propylacetamide was heated at the boiling point of the mixture with agitation. The percentage of polyethylene in the mixture was approximately 0.5%. A clear, colorless solution of the polymer in the solvent resulted. On cooling to room temperature, the liquid became cloudy because of the formation of a finely divided precipitate. On reheating, the precipitate redissolved at about 100° C.

Examples I and II show how the properties of solutions of polyethylene in a dialkylamide vary with the concentration of polymer.

*Example III*

A mixture of commercial molding-grade polypropylene of density 0.90 and di-n-propylacetamide was heated at the boiling point of the mixture with agitation. The percentage of polypropylene in the mixture was approximately 0.5%. A clear, colorless solution of the polymer in the solvent resulted. On cooling to room temperature, the liquid became cloudy because of the formation of a finely divided precipitate. On reheating, the precipitate redissolved. The resultant solution can be cast into a film by the method following Example I.

*Example IV*

To 10 g. of an aqueous dispersion of low-density ethylene polymer containing about 35% total solids (about 34% polyethylene, of particle size less than 0.5 micron) was added 7.5 g. of water and 17.5 g. of di-n-propylacetamide with manual stirring. The final mixture contained 10% total solids, 50% di-n-propylacetamide, and 40% water. It was milled for 24 hours with ½″ glass balls. The dispersion appeared to be completely homogeneous after only 30 minutes' ball-milling. It could be readily filtered under pressure through a 100-mesh screen. The properties of the dispersion were not changed by agitation or by long storage.

*Example V*

By the procedure of Example IV, with substitution of diethylpropionamide for di-n-propylacetamide, a dispersion was prepared containing 10% solids, 50% diethylpropionamide, and 40% water. Similar polyethylene dispersions were obtained with di-n-propylformamide, diethylacetamide, or diisopropylamide as the dialkylamide component.

The dispersions prepared as described in Examples IV and V were used to prepared polyethylene films having unusual properties. In one such preparation, a wet film was cast on a Pyrex glass plate from the dispersion of Example IV with a doctor knife having a clearance of 10 mils. The glass plate containing the wet film was placed on an aluminum hot plate that had been preheated to 120° C. Water was allowed to evaporate under these conditions until the originally milky, liquid film had become translucent and tacky (1.5 minutes). The glass plate containing the tacky film was then immersed in water, which coagulated the partly coalesced film. The film was allowed to stand in the water for at least two hours to wash out all the remaining di-n-propylacetamide and was then air-dried. The resulting film was opaque and porous, was 1.6–1.8 mils thick, and had an optical density of 0.30–0.37, depending on the thickness. It had a pleasant, satiny feel and could be used as a wrapping foil.

Optical density may be defined as $$\log \left(\frac{I_0}{I_t}\right)$$

where $I_0$ is intensity of incident light and $I_t$ is intensity of transmitted light, and in the above film was measured on a Welch Densichron.

The bulk density of the film was 0.54 g./cm.$^3$. Since the density of the polyethylene employed was 0.92 and the bulk density was 0.54, the film was composed of about 41% voids.

In another film preparation, the dispersion of Example IV was used. A film was made from this dispersion by the method just described, except that the drying time at 120° C. was extended to four minutes. A translucent film 0.7–0.8 mil thick and having an optical density of 0.06–0.11 was obtained.

The dispersion of Example V was used to make coatings having unusual properties. A piece of 1-mil, biaxially oriented film, prepared by conventional methods from an ethylene polymer of density ca. 0.95, was applied to a Pyrex glass plate with glycerol as an adhesive. A rubber squeegee was used to press the film firmly against the plate and remove bubbles of air. This film was used as a support for a polyethylene film prepared by the methods of this invention. A film was made on this support from the dispersion of Example V by casting with a doctor knife at a clearance of 10 mils, evaporating liquids for 1.75 minutes at 120° C., immersing and washing in water, and drying in air. The final product was a uniform, opaque, porous coating on the clear polyethylene base. The coating was 1.1–1.3 mils thick, had an optical density of 0.16–0.19, could be readily clarified by stylus pressure, and adhered strongly to the polyethylene base. The composite film is useful as a wrapping foil, as a protective and decorative base, and in graphic arts applications.

The polyolefin solutions and dispersions of the present invention are also useful in the treatment of paper to impart low water absorption while retaining good vapor transmission as in the manufacture of photographic papers. Thus, the dispersions can be added to the fiber slurry in the beater of a conventional paper machine or, alternatively, formed sheets of paper may be treated by surface impregnation with such dispersions. By these means, photographic paper can be made for coating with the usual colloid silver halide, e.g., gelatine silver halide, layers to impart rapid drying properties to the finished photographic elements and thus reduce the time required for processing the elements in the usual photographic baths.

Since obvious modifications and equivalents in the invention will be evident to those skilled in the chemical arts, I propose to be bound solely by the appended claims.

The embodiments of the invention in which an exclusive property or privilege is claimed are defined as follows:

1. A dispersion of a polymer of an olefin of 2–3 carbons in a water-soluble dialkylamide of an alkanoic acid wherein the N-alkyl groups each contain 1–3 carbons, and together contain at least 4 carbons, and the alkanoic acid contains 1–3 carbons.
2. The dispersion of claim 1 wherein the polymer is in solution.
3. The dispersion of claim 1 wherein the polymer is polyethylene.
4. The dispersion of claim 1 wherein the polymer is polypropylene.
5. The dispersion of claim 1 wherein the dialkylamide is di-n-propylacetamide.
6. The dispersion of claim 1 wherein the dialkylamide is di-n-propylformamide.
7. The dispersion of claim 1 wherein the dialkylamide is diethylacetamide.
8. The dispersion of claim 1 wherein the dialkylamide is diisopropylacetamide.
9. The dispersion of claim 1 wherein the dialkylamide is diethylpropionamide.
10. The dispersion of claim 1 containing, additionally, water.
11. The dispersion of claim 10 wherein the polymer is polyethylene.
12. The dispersion of claim 10 wherein the polymer is polypropylene.
13. The dispersion of claim 10 wherein the dialkylamide is di-n-propylacetamide.
14. The dispersion of claim 10 wherein the dialkylamide is di-n-propylformamide.
15. The dispersion of claim 10 wherein the dialkylamide is diethylacetamide.
16. The dispersion of claim 10 wherein the dialkylamide is diisopropylacetamide.
17. The dispersion of claim 10 wherein the dialkylamide is diethylpropionamide.

References Cited in the file of this patent

UNITED STATES PATENTS

| | | |
|---|---|---|
| 2,530,852 | Bixby | Nov. 21, 1950 |
| 2,852,580 | Geiser | Sept. 16, 1958 |
| 2,898,233 | Hmiel | Aug. 4, 1959 |